United States Patent [19]
Silvy et al.

[11] Patent Number: 4,700,056
[45] Date of Patent: Oct. 13, 1987

[54] OBJECTIVE LENS FOCUS INITIALIZATION SYSTEM

[75] Inventors: Dorrel R. Silvy, Elbert; Todd D. Baumann, Berthoud; Roger R. Bracht, Colorado Springs, all of Colo.

[73] Assignee: Optotech, Inc., Colorado Springs, Colo.

[21] Appl. No.: 797,434

[22] Filed: Nov. 13, 1985

[51] Int. Cl.⁴ .......................... G01J 1/20; G11B 5/09
[52] U.S. Cl. ........................ 250/201; 369/45
[58] Field of Search ............. 250/201 DF; 369/45

[56] References Cited

U.S. PATENT DOCUMENTS

| | | | |
|---|---|---|---|
| 4,446,546 | 5/1984 | Miller | 369/45 |
| 4,512,003 | 4/1985 | Kimura et al. | 250/201 DF X |
| 4,544,837 | 10/1985 | Tanaka et al. | 250/201 DF |

Primary Examiner—Eugene R. LaRoche
Assistant Examiner—David Mis
Attorney, Agent, or Firm—Kinney & Lange

[57] ABSTRACT

A focus initialization system adapted for use with an optical data recording system. Focus initialization is performed while a tracking servo loop is in an open loop mode, and an objective lens is fixedly positioned along a tracking axis. With a focus servo system in an open loop mode, the objective lens is cyclically driven along a focus axis about a neutral position and between offset positions. Displacement of the offset positions from the neutral position is increased with each successive cycle. After the objective lens has been positioned at each peak offset position, the focus servo loop is closed and track crossings resultant from eccentricity of the servo tracks on the record carrier are counted. Focus capture is recognized when at least a predetermined number of track crossings are counted during a predetermined time period. If less than the predetermined number of track crossings are counted during the predetermined time period, the focus servo loop is opened and the objective lens is driven to a successive offset position.

36 Claims, 7 Drawing Figures

OBJECTIVE LENS FOCUS INITIALIZATION SYSTEM

BACKGROUND OF THE INVENTION

1. Field of the Invention

The present invention relates to optical data recording systems. In particular, the present invention is an objective lens focus initialization system for an optical data recording system.

2. Description of the Prior Art.

Optical data recording technology has developed to the point where it is commonly found in many consumer electronic products. Optical video disks and optical compact audio disks have, for example, become very popular. This technology is also being adapted to high density optical data recording and storage systems. With continued advances in this technology it is believed that optical systems of this type will be able to compete in terms of performance and cost with the magnetic data storage systems currently in widespread use.

Optical data recording systems of the types referred to above include a record carrier, or disk, on which a single servo track is spirally positioned, or a plurality of servo tracks are concentrically positioned. A laser beam which is focused by an objective lens is used to write data onto, and to read data from, the servo tracks. Optical data recording systems also include a focus servo system for driving the objective lens about a focus axis, and maintaining the laser beam focused on a servo track. A tracking servo system is used to drive the objective lens along a tracking axis, and maintain the laser beam centered over a desired servo track.

To obtain the highest possible data density, individual servo tracks are positioned extremely close to one another on a recording surface of the record carrier. Minimum spacing is determined by various optical and physical properties of the system. Servo track spacings on the order of 1.6 μm, for example, are common with current technology. Even though the servo tracks are placed extremely close together, their positioning with respect to the rotational axis of the record carrier is typically somewhat eccentric. In other words, the radial position of a given servo track from the rotational axis is not constant all the way around the record carrier. This eccentricity, or run-out, can range between 20 and 50 μm per servo track revolution.

Upon the application of power to an optical data storage system, a focus initialization must be performed to bring the objective lens within focus capture range of the record carrier recording surface. Only after this initialization is performed is the focus servo system able to optically recognize the servo tracks and obtain information from them. Once the lens is positioned within focus capture range, the focus servo system is able to lock into focus, and the tracking servo system can lock onto a desired servo track. The focus initialization procedure is also performed when the focus servo system loses focus while in operation. Dirt or other flaws on the record carrier, or physical movement of the system, can, for example, cause focus loss.

In order to initialize focus, the focus servo system must have some criterion, or basis, to verify placement of the lens within focus capture range of the record carrier recording surface. One commonly used technique is described in U.S. Pat. No. 4,446,546. With this technique, the lens is simply moved toward the record carrier from the far end of its travel limit furthest from the record carrier. A focus error signal is monitored during this period of motion and focus capture indicated when the lens is at such a position that the focus error signal is at a point between its peaks.

Evaluating the focus error signal to verify focus capture does not always, however, produce optimum results. One common problem is the result of physical properties of the record carrier itself. Due to a high degree of sensitivity of the recording surface to dust, scratches and other physical imperfections, the recording surface is typically covered with a transparent protective layer. Notwithstanding its transparency, the protective layer will reflect radiation from the laser beam and produce stray or erroneous focus signals which known focus initialization systems can mistake for focus error signals. The focus servo system can use these stray signals to initialize focus on the protective layer, rather than the recording surface itself. In extreme cases, stray focus error signals can cause the objective lens to crash onto the protective layer. At best, the stray signals reduce overall performance of the focus initialization system.

There is clearly a continuing need for improved focus initialization systems. Performance requirements of high density optical data storage systems, in particular, require a focus initialization system which can quickly and accurately bring the objective lens within focus capture range of the record carrier recording surface. The focus initialization system should use criteria other than the focus error signal to verify focus capture. Such a system would be especially desirable if it were insensitive to stray reflections from the record carrier protective layer. Due to economic pressures in the marketplace, the focus initialization system must be inexpensive. It should, therefore, be capable of implementation with a minimum of hardware and software.

SUMMARY OF THE INVENTION

The present invention is a focus initialization system for positioning objective lens means within focus capture range of an optical record carrier recording surface in an optical data recording system. It is inexpensive due to minimal hardware requirements. The software required to implement the system is easily developed, and occupies little memory. Most importantly, the system is extremely fast and accurate, being insensitive to stray radiation reflections from the protective layer of the recording surface. This system is, therefore, particularly well suited for high density optical recording systems.

Included is an optical record carrier having a recording surface on which servo track portions are spaced about a rotational axis. The record carrier is rotated about its rotational axis by motor means. Objective lens means focus a beam of radiation along a focus axis oriented generally perpendicular to the record carrier recording surface, and collect modulated radiation from the record carrier. Detector means responsive to the objective lens means produce signals representative of modulated radiation collected by the objective lens means.

Lens focus drive means drive and position the objective lens means along the focus axis in response to focus drive signals. Focus capture recognition means are responsive to the detector means and produce the focus drive signals. The focus drive signals are produced in a manner which causes the lens focus drive means to cyclically drive the objective lens means about a neutral position between peak offset positions along the focus axis. The focus drive signals also cause displacement of the peak offset positions from the neutral position to increase until the objective lens means is within focus capture range of the record carrier recording surface.

The focus capture recognition means also determine whether the objective lens means is positioned within focus capture range of the record carrier recording surface at each offset position. Focus capture is recognized when the objective lens means sufficiently focuses the beam of radiation onto the recording surface to enable the detector means to produce signals representative of servo track portions thereon.

In preferred embodiments, the detector means includes a tracking error detector for producing a tracking error signal. The focus capture recognition means includes track crossing detector means, track crossing counter means, and focus capture control means, The track crossing detector means is responsive to the tracking error detector means and produces track crossing signals, preferably in the form of pulses, which are representative of relative motion along a tracking axis between the objective lens means and individual servo track portions of the record carrier. The track crossing counter means is responsive to the track crossing detector means and counts track crossing signals.

The focus capture control means causes the lens focus drive means to operate in an open loop mode and drive the objective lens means to each offset position. Once the objective lens means is positioned at an offset position, the focus capture control means causes the lens focus drive means to operate in a low gain closed loop mode, and causes track counter means to count track crossings for a predetermined first time period. If at least a predetermined first number of track crossings are counted within the first time period, the focus capture control means causes the lens focus drive means to operate in a high gain closed loop mode, and causes the track crossing counter means to count track crossing signals for a predetermined second time period.

If less than the first number of track crossings are counted during the first time period, or less than a second number of track crossings are counted during the second time period, the focus capture control means causes the lens focus drive means to operate in the open loop mode, and to drive the objective lens means to a succeeding offset position. Focus capture is recognized when at least the second number of track crossings are counted within the second time period.

DETAILED DESCRIPTION OF THE PREFERRED EMBODIMENTS

Figure 1:
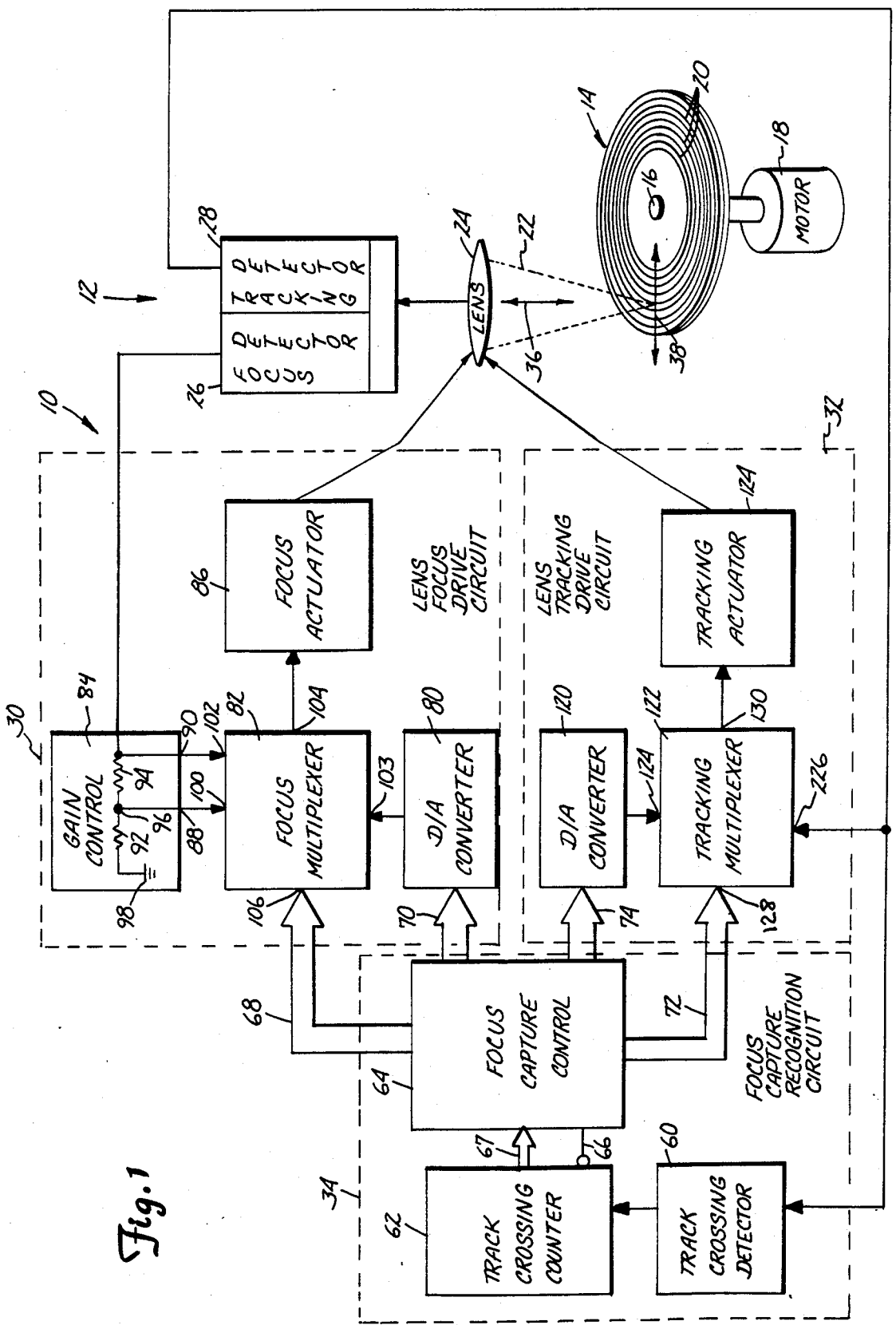
FIG. 1 is a block diagram representation of an optical data recording system utilizing the focus initialization system of the present invention.

Focus initialization system 10 of the present invention, optical data recording system 12, and their functional interrelationship, are illustrated generally in FIG. 1. Optical data recording system 12 includes record carrier 14 which is mounted on spindle 16 and is rotated about a rotational axis by motor 18. Information is optically encoded onto servo tracks 20 which are positioned on a recording surface of record carrier 14. Radiation beam 22 is produced by a source of radiation such as a laser (not shown), and focused onto record carrier 14 by objective lens 24. Objective lens 24 also collects from record carrier 14 modulated radiation representative of information stored within servo tracks 20. The collected modulated radiation is impinged upon an optical detector apparatus which includes focus error detector 26 and tracking error detector 28.

Focus initialization system 10 includes lens focus drive circuit 30, lens tracking drive circuit 32, and focus capture recognition circuit 34. Lens focus drive circuit 30 is a servo drive system responsive to both focus error detector 26 and focus capture recognition circuit 34. Lens focus drive circuit 30 drives and positions objective lens 24 about an optical or focus axis 36. As shown in FIG. 1, focus axis 36 is oriented generally perpendicular to the recording surface of record carrier 14.

Lens tracking drive circuit 32 is a servo drive system responsive to tracking error detector 28 and focus capture recognition circuit 34. Objective lens 24 is driven and positioned about tracking axis 38 by lens tracking drive circuit 32. As shown, tracking axis 38 extends in a radial direction from the rotational axis defined by spindle 16, and is perpendicular both to focus axis 38 and portions of servo tracks 20 which it crosses.

Focus capture recognition circuit 34 is responsive to tracking error detector 28 and produces focus and tracking drive signals used by lens focus drive circuit 30 and lens tracking drive circuit 32, respectively, to bring objective lens 24 within focus capture range of a recording surface of record carrier 14. The focus drive signals produced by focus capture recognition circuit 34 cause lens focus drive circuit 30 to cyclically drive objective lens 24 about a neutral position between offset positions on focus axis 36. The displacement of objective lens 24 from the neutral position at the offset positions is increased until lens 24 is within focus capture range of the record carrier recording surface. At each offset position, focus capture recognition circuit 34 determines whether lens 24 is within focus capture range of the recording surface. Focus capture is recognized when lens 24 sufficiently focuses radiation beam 22 onto the recording surface of record carrier 20 to enable tracking detector 28 to produce signals representative of servo tracks 20.

Figure 2:
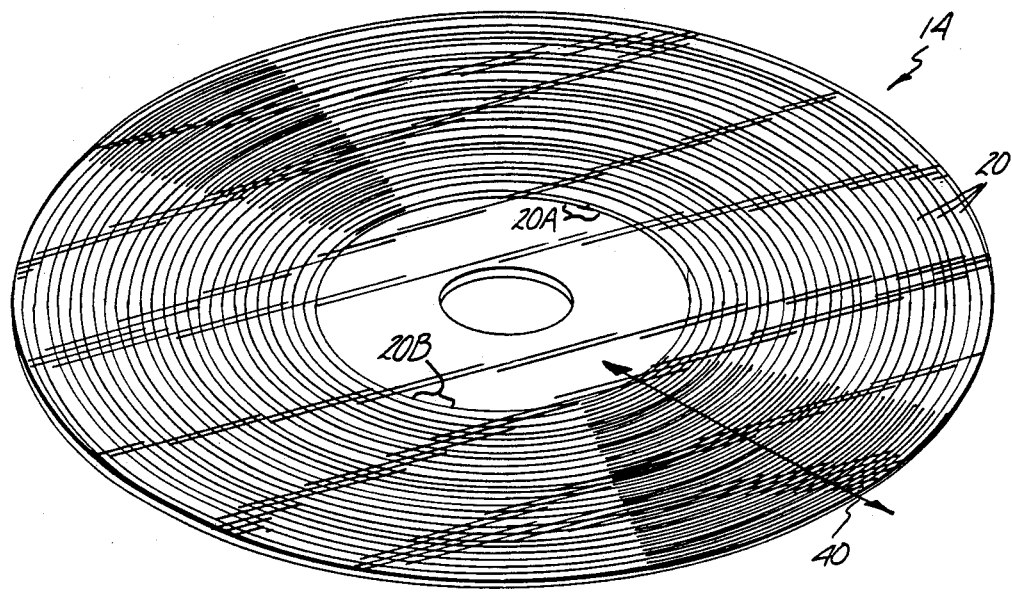
FIG. 2 is a perspective view of the top side of an optical record carrier illustrating servo track placement thereon.

A detailed understanding of the operation of focus initialization system 10, and in particular focus capture recognition circuit 34, will be facilitated by a description of some of the characterisitic features of optical data recording system 12. Record carrier 14 is commercially available in several different forms from a number of different manufacturers. In one form, as shown in FIG. 2, a plurality of servo tracks 20 are formed as closed rings and concentrically positioned about the rotational axis. Another form of record carrier 14, not shown, includes a single servo track 20 which is shaped in the form of a spiral. In both forms, individual arcuate portions of servo track(s) 20 are substantially concentrically positioned about the rotational axis, and radially spaced from one another. All references to "servo tracks 20" throughout the remainder of this specification apply to both forms.

In one commercially available record carrier 14, individual servo tracks 20 are spaced approximately 1.6 $\mu m$ from each other. Despite the small spacing, individual revolutions of servo tracks 20 on record carrier 14 are not perfectly circular. Rather, servo tracks 20 are somewhat eccentrically positoned on record carrier 14. The radial position of each servo track 20 with respect to the rotational axis therefore varies with angular position about record carrier 14. By way of example, arcuate servo track portion 20A, shown in FIG. 2, can be radially spaced from the rotational axis by a distance greater than or less than that of servo track portion 20B. This can be the case even though they are portions of the same servo track 20. This eccentricity, or run-out, is commonly between 20 and 50 $\mu m$. As a result of this eccentricity, individual servo tracks 20 will appear to move in and out, in a radial direction, from the rotational axis when record carrier 14 is rotated by motor 18. This movement is graphically illustrated by line 40 in FIG. 2, and is generally parallel to tracking axis 38.

Figure 3:
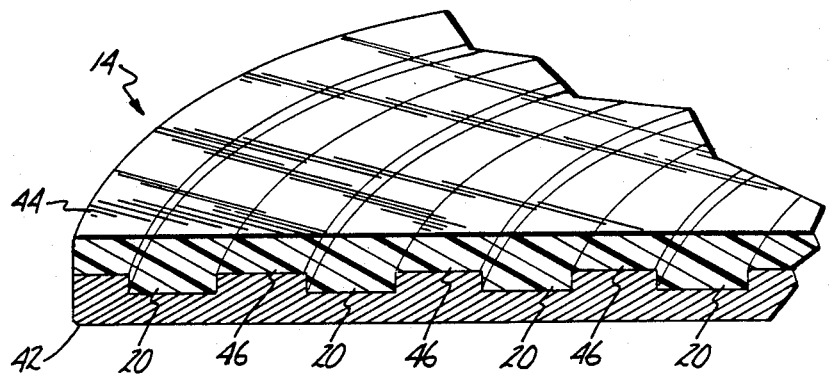
FIG. 3 is a magnified sectional view of the record carrier shown in FIG. 2 illustrating a recording surface and protective layer thereof.

FIG. 3 is a magnified sectional view of a portion of record carrier 14. As shown, record carrier 14 is formed of a radiation sensitive recording surface 42, and a protective layer 44. Servo tracks 20 are formed as grooves in recording surface 42, and are radially separated from each other by land portions 46. In the embodiment shown, servo tracks 20 have a width which is approximately equal to a width of land portions 46.

Recording surface 42 of record carrier 14 is extremely sensitive to deterioration from scratches, dust, humidity, and other extraneous means. Protective layer 44 is formed of transparent material which is bonded to recording surface 42, thereby protecting surface 42 from these extraneous means. Plastic materials such as polyvinyl chloride are commonly used for protective layer 44.

Figure 4:
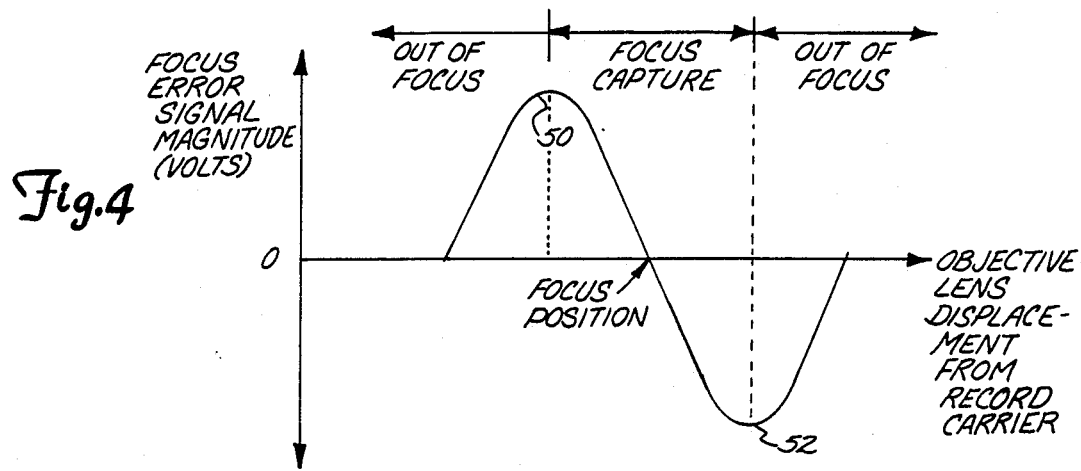
FIG. 4 is a graphic representation of the output of a focus error detector as a function of objective lens displacement from the record carrier recording surface.

Focus error detector 26 (shown in FIG. 1) produces an electric signal which is representative of the relative distance between objective lens 24 and record carrier 14. In particular, focus error detector 26 produces a signal which represents the degree to which radiation beam 22 is or is not focused on the recording surface 42 of record carrier 14 by objective lens 24. A focus error signal produced by a commonly used quadrature-type focus error detector 26 is illustrated in FIG. 4. When objective lens 24 is far from focus, i.e. when the lens is converging radiation beam 22 to a focus point between the lens and the recording surface or beyond the recording surface, the output signal of focus error detector 26 is essentially zero. As objective lens 24 is moved toward an in-focus position from one end of its travel limit, from a position near recording surface 42, for example, magnitude of the focus error signal increases to a peak 50. From peak 50 the magnitude of the focus error signal decreases as lens 24 continues to be moved toward the focus position. As objective lens 24 is driven toward the focus position from the opposite end of its travel limit, a position furthest from recording surface 42, for example, magnitude of the focus error signal decreases to a negative peak 52, from which it increases as objective lens 24 is moved further toward the focus position.

When objective lens 24 is at its focus position, and radiation beam 22 is focused on recording surface 42 of record carrier 14, the focus error signal has zero magnitude. Objective lens 24 is within focus capture range of the recording surface when it has a position between those represented by peaks 50 and 52 of the focus error signal. The portion of the focus error signal between peaks 50 and 52 is known as the linear region. Magnitude and polarity of the linear region of the focus error signal are linearly related to the distance and direction, respectively, of objective lens 24 from the focus position.

Figure 5:
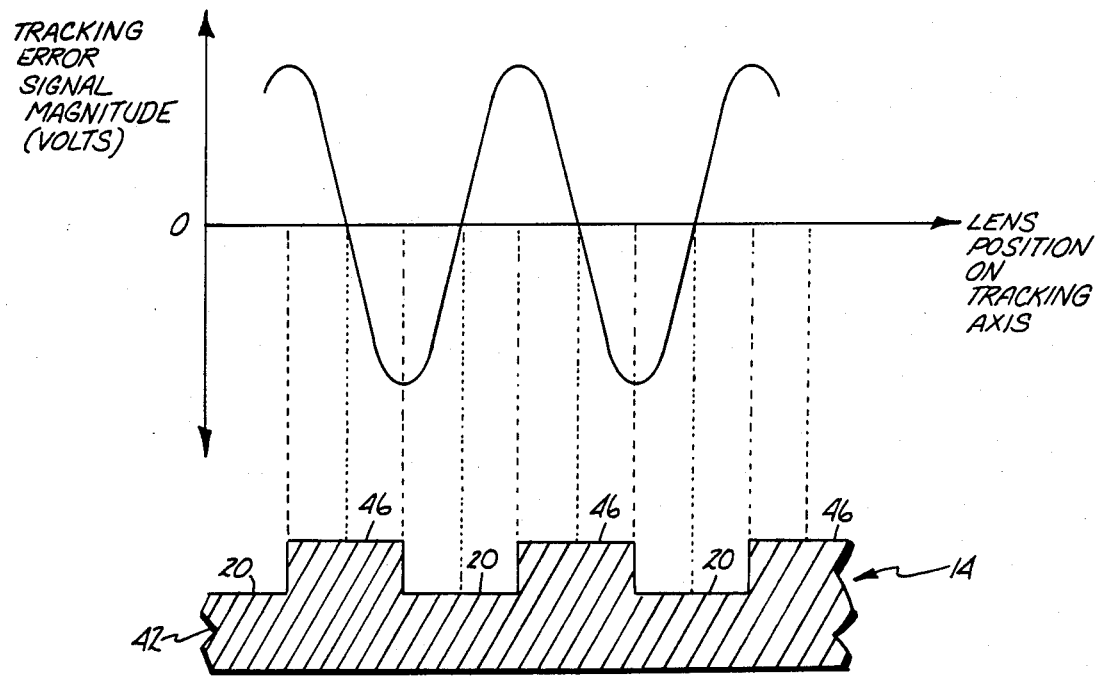
FIG. 5 is a graphic representation of an output of a tracking detector as a function of lens position along a tracking axis.

Tracking error detector 28 (shown in FIG. 1) produces a tracking error signal representative of the direction and distance of objective lens 24, and therefore radiation beam 22, from individual servo tracks 20. A tracking error signal produced by a commonly used quadrature-type detector is illustrated in FIG. 5. As shown, the tracking error signal resembles a sine wave and has a magnitude of zero when a center of objective lens 24, and, therefore, radiation beam 22, is centered over servo tracks 20 and land portions 46. Each "zero crossing" is, therefore, representative of a center of a servo track 20 or a land portion 46. Peaks of the tracking error signal occur at transitions between land portions 46 and servo tracks 20. The zero crossings of the tracking error signal, therefore, indicate or represent relative motion between objective lens 24 and servo tracks 20. The tracking error signal shown in FIG. 5, and its zero crossings, are produced by tracking error detector 28 only when objective lens 24 is within focus capture range of recording surface 42 of record carrier 14.

Unlike those of the prior art, focus initialization system 10 of the present invention does not make use of the focus error signal as a criterion or indicium for determining whether objective lens 24 is within focus capture range of the recording surface of record carrier 14. Rather, focus initialization system 10 uses the tracking error signal, and in particular, "track crossing" signals representative of relative motion between objective lens 24 and servo tracks 20 along tracking axis 38, to indicate focus capture. Focus initialization system 10 is therefore insensitive to stray focus error signals produced by reflections of radiation beam 22 from the protective layer 44 of record carrier 14.

Referring back to FIG. 1, focus capture recognition circuit 34 is shown to include track crossing detector 60, track crossing counter 62, and focus capture control 64. Track crossing detector 60 is connected to receive the tracking error signal produced by tracking error detector 28. Track crossing detector 60 produces signals representative of relative motion between objective lens 24 and individual servo tracks 20. In a preferred embodiment, track crossing detector 60 produces a "track crossing" signal in the form of a pulse each time objective lens 24 passes over the center of either a land portion 46 or a servo track 20. The tracking error signal has zero magnitude at these instants, and each "zero crossing" of the tracking error signal therefore represents movement over a land portion 46 or a servo track 20. The fact that the zero crossing signals are produced by tracking detector 28 indicates that objective lens 24 is within, or near, focus capture range of the recording surface of record carrier 14. As will be described in greater detail in later portions of this specification, the relative motion can be produced by the eccentricity of servo tracks 20 when record carrier 14 is rotated. Track crossing detector 60 can be easily constructed from discrete or integrated circuit elements.

Track crossing counter 62 is responsive to track crossing detector 60 and produces a signal representative of the number of track crossing pulses produced by track crossing detector 60. In the embodiment shown in FIG. 1, track crossing counter 62 is a digital counter which includes a clear input terminal 66. In this embodiment, track crossing counter 62 produces a digital signal, on bus 67, representative of the number of track crossing pulses received from track crossing detector 60 after a CLEAR signal is received at clear input terminal 66. Digital counters of this type are commercially available.

Focus capture control 64 is preferably a programmable control device, such as a microprocessor, which includes associated memory (not shown) for storing data, and timing means (not shown), for producing signals representative of elapsed time periods. Microprocessors of this type are commercially available and well known. As shown in FIG. 1, focus capture control 64 is responsive to track crossing counter 62 and receives from bus 67 a digital signal representative of a number of track crossing signals detected by track crossing detector 60. Focus drive signals, tracking drive signals, and a track crossing counter clear signal are all produced by focus capture control 64.

The focus drive signals produced by focus capture control 64 include focus mode control signals representative of the mode of operation of lens focus drive circuit 30, and a focus position signal representative of a desired position of objective lens 24 on focus axis 36. The focus mode control signals, including a first or LOW GAIN CLOSED LOOP focus mode control signal, a second or HIGH GAIN CLOSED LOOP focus mode control signal, and an OPEN LOOP focus mode control signal, are digital control signals which are propagated to lens focus drive circuit 30 on bus 68. The focus position signals are digital signals which are propagated to lens focus drive circuit 30 on bus 70.

The tracking drive signals produced by focus capture control 64 include tracking mode control signals representative of the mode of operation of lens tracking drive circuit 32, and a tracking position signal representative of a desired position of objective lens 24 on tracking axis 38. The tracking mode control signals, including a CLOSED LOOP tracking mode control signal, and an OPEN LOOP tracking mode control signal, are digital signals which are propagated to lens tracking drive circuit 32 by bus 72. The tracking position signals are digital signals which are propagated to lens tracking drive circuit 32 on bus 74. Focus capture control 64 also produces the track crossing counter CLEAR signal which is propagated to clear input terminal 66 of track crossing counter 62.

Lens focus drive circuit 30, as shown in FIG. 1, includes digital-to-analog (D/A) converter 80, focus multiplexer 82, gain control 84, and focus actuator 86. D/A converter 80 is connected to bus 70 to receive the digital focus position signals from focus capture control 64. D/A converter 80 converts the digital focus position signals to analog form. The analog focus position signals are then supplied to focus multiplexer 82.

Gain control 84 is responsive to focus error detector 26 and controls gain of the focus error signal received therefrom. In the preferred embodiment shown in FIG. 1, gain control 84 is a passive voltage divider network formed by resistors 92 and 94. Resistor 92 has a first terminal connected to ground 98 and a second terminal connected to node 96. A first terminal of resistor 94 is connected to node 96, while a second terminal is connected to receive the focus error signal produced by focus error detector 26.

The embodiment of gain control 84 shown in FIG. 1 produces a first or low gain focus error signal at node 96. The low gain focus error signal is supplied by gain control 84 at first output terminal 88. A second or high gain focus error signal is also produced by gain control 84. The high gain focus error signal is supplied by gain control 84 at second output terminal 90. As shown in FIG. 1, the high gain focus error signal can be a replica of the focus error signal produced by focus error detector 26. Gain of the low gain focus error signal is less than that of the high gain focus error signal in the sense that it has a lower voltage change for a given amount of focus error than the high gain focus error signal. The low gain focus error signal is therefore less sensitive to focus errors than the high gain focus error signal. Gain control 84 can take other forms as well.

Focus multiplexer 82 includes a first signal input terminal 100, a second signal input terminal 102, and a third signal input terminal 103. First signal input terminal 100 and second signal input terminal 102 are connected to receive the low gain focus error signal, and the high gain focus error signal, respectively, from gain control 84. Third signal input 103 is connected to receive the analog lens position signal from D/A converter 80. Focus multiplexer 82 also includes a signal output terminal 104 and a control input terminal 106. Control input terminal 106 is connected to bus 68 to receive the focus mode control signals from focus capture control 64.

Focus multiplexer 82 is a digital device which functions much like a switch. In response to the particular mode control signal received, focus multiplexer 82 supplies the signal received at either the first, second, or third signal input terminals 100, 102, and 103, respectively, to output terminal 104. The selected signal is then propagated from output terminal 104 to focus actuator 86. Focus actuator 86 drives objective lens 24 along focus axis 36, and positions the lens at positions represented by the received signal. Focus actuator 86 is commercially available, and is typically an integral element of optical head assemblies.

When focus capture control 64 produces the LOW GAIN CLOSED LOOP focus mode control signal, focus multiplexer 82 supplies the low gain focus error signal from gain control 84 to focus actuator 86. Lens focus drive circuit 30 is thereby operated in a LOW GAIN CLOSED LOOP focus mode, with focus actuator 86 driving objective lens 24 along focus axis 36 in response to the low gain focus error signal. In the LOW GAIN CLOSED LOOP FOCUS mode, a closed focus servo control loop is established since information representative of focus (the low gain focus error signal) is used to control position of objective lens 24. Since the low gain focus error signal is representative of both distance and direction of focus errors, focus actuator 86 uses this signal to maintain focus in the LOW GAIN CLOSED LOOP focus mode.

When focus capture control 64 produces the HIGH GAIN CLOSED LOOP focus mode control signal, focus multiplexer 82 supplies the high gain focus error signal from gain control 84 to focus actuator 86. Focus capture control 64 thereby operates lens focus drive circuit 80 in a HIGH GAIN CLOSED LOOP focus mode, with focus actuator 86 driving objective lens 24 along focus axis 36 in response to the high gain focus error signal. In the HIGH GAIN CLOSED LOOP focus mode, a closed focus servo control loop is again established since the high gain focus error signal is used to control the position of objective lens 24. Focus actuator 86 uses the high gain focus error signal to maintain objective lens 24 focused on a servo track 20. Lens focus drive circuit 30 has a higher sensitivity when operated in the HIGH GAIN CLOSED LOOP focus mode, and causes objective lens 24 to be more responsive to changes in the focus error signal than in the LOW GAIN CLOSED LOOP focus mode. Since the high gain focus error signal has a higher gain than the low gain focus error signal, lens focus drive circuit 30 more accurately maintains focus in the HIGH GAIN CLOSED LOOP focus mode than in the LOW GAIN CLOSED LOOP focus mode.

When focus capture control 64 produces the OPEN LOOP focus mode control signal, focus multiplexer 82 propagates the analog focus position signal from D/A converter 80 to focus actuator 86. Lens focus drive circuit 30 is thereby operated in an OPEN LOOP focus mode, with focus actuator 86 positioning objective lens 24 at a position on focus axis 36 represented by the focus position signal. In the OPEN LOOP focus mode, an open focus servo control loop is established since the focus error signal is not used to position objective lens 24. The focus servo control loop is therefore open between focus actuator 86 and focus detector 26.

Figure 6:
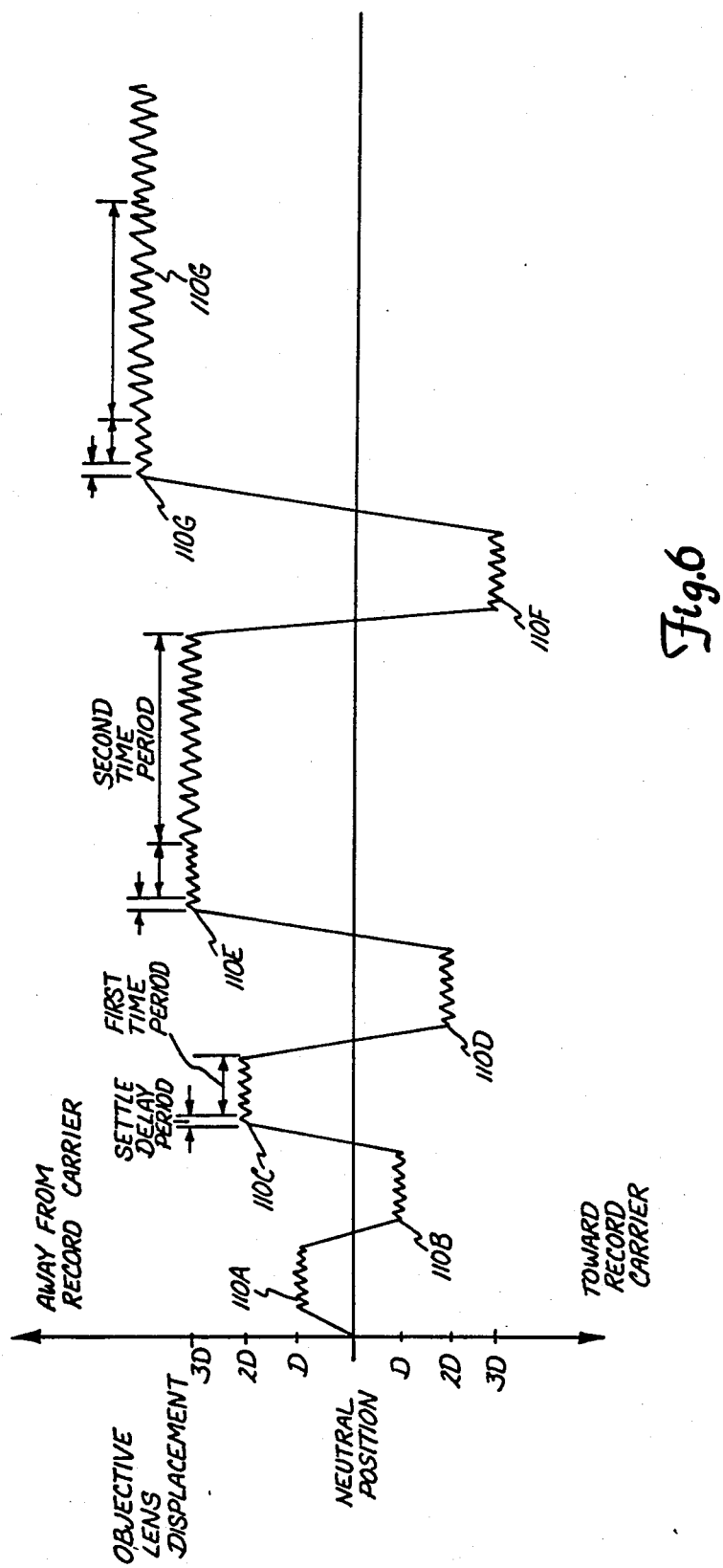
FIG. 6 is a graphic illustration of cyclic objective lens displacement about a focus axis as produced by the focus initialization system of the present invention.

The preferred motion of objective lens 24 during focus initialization is illustrated in FIG. 5. During focus initialization, focus capture control 64 produces digital focus position signals which cause lens focus drive circuit 30, through focus actuator 86, to drive objective lens 24 along focus axis 36 in a cyclic motion. A mechanical lens suspension system (not shown) supports objective lens 24 in a neutral position above record carrier 14 when the lens is not being driven by lens focus drive circuit 30. As shown in FIG. 6, focus capture control 64 causes focus drive circuit 30 to cyclically drive objective lens 24 about its neutral position between offset positions 110. Successive offset positions are on alternate sides of the neutral position. Displacement of each successive peak offset position 110, on both sides of the neutral position, preferably increases by a predetermined distance D with each successive cycle. In one preferred embodiment of the present invention, D/A converter 80 is an eight bit device. Focus capture control 64 produces appropriate digital focus position control signals to divide the plus or minus 1mm movement of objective lens 24 into 255 sections. Displacement, D, of each successive offset position 110 from the neutral position in this embodiment therefore increases by approximately 7.8 μm. Focus capture control 64 is easily programmed to produce drive signals of these types.

Referring back to FIG. 1, lens tracking drive circuit 32 is shown to include digital-to-analog (D/A) converter 120, tracking multiplexer 122, and tracking actuator 124. D/A converter 120 is connected to receive digital tracking position signals from focus capture control 64 on bus 74. D/A converter 120 converts the digital tracking position signals to analog form.

Tracking multiplexer 122 includes a first signal input terminal 124, a second signal input terminal 126, a control input terminal 128, and a signal output terminal 130. First signal input terminal 124 is connected to receive the analog tracking position signal from D/A converter 120. Second signal input terminal 126 is connected to receive the tracking error signal from tracking error detector 28. Control input terminal 128 is connected to receive the tracking mode control signals produced by focus capture control 64. Tracking actuator 124 drives objective lens 24 along tracking axis 38, and positions the lens at positions represented by the received signals. Tracking actuator 124 is typically an integral element of an optical head assembly which includes objective lens 24.

Tracking multiplexer 122 operates in a manner very much like that of focus multiplexer 82. When an OPEN LOOP tracking mode control signal is received at control input terminal 128, tracking multiplexer 122 supplies the tracking position signal from D/A converter 120 to tracking actuator 124. An open tracking servo control loop is established in the OPEN LOOP tracking mode. Lens tracking drive circuit 32 is thereby operated in an OPEN LOOP tracking mode, with tracking actuator 124 driving objective lens 24 along tracking axis 38 in response to the tracking position signals. Lens tracking drive circuit 32 positions lens 24, and a focus point of radiation beam 22, over a desired servo track 20 when operated in the OPEN LOOP tracking mode.

Tracking multiplexer 122 supplies the tracking error signal received from tracking detector 28 to tracking actuator 124 when the CLOSED LOOP tracking mode control signal is received at control input terminal 128. Tracking drive circuit 32 is thereby operated in a CLOSED LOOP tracking mode, with tracking actuator 124 driving objective lens 24 along tracking axis 38 in response to the tracking error signal. A closed tracking servo control loop is established in the CLOSED LOOP tracking mode. The lens tracking drive circuit 32 thereby maintains objective lens 24, and a focus point of radiation beam 22, centered over a particular servo track 20.

The operation of focus initialization system 10 is best described with reference to FIGS. 6 and 7. The entire focus initialization procedure is preferably performed while objective lens 24 is stationarily positioned over record carrier 14. While lens tracking drive circuit 32 is operated in its OPEN LOOP tracking mode, represented by step 140, focus capture control 64 will produce a tracking position signal representative of a particular position on tracking axis 38, as represented by step 142. Objective lens 24 is maintained at this tracking position throughout the focus initialization procedure. As record carrier 14 is rotated by motor 18, servo tracks 20 will move back and forth along the tracking axis relative to objective lens 24, due to the eccentricity of their positioning on record carrier 14. The remaining steps of the focus initialization procedure bring objective lens 24 within focus capture range of the recording surface so that this motion can be detected by tracking detector 28.

As represented by steps 144 and 146, lens focus drive circuit 30 is next operated in the OPEN LOOP focus mode, with focus capture control 64 producing a focus position signal representative of a first offset position 110A. (See FIG. 6). Objective lens 24 is then driven to, and positioned at, offset position 110A by focus drive circuit 30.

Once objective lens 24 is positioned at peak offset position 110A, focus capture control 64 causes lens focus drive circuit 30 to operate in the LOW GAIN CLOSED LOOP focus mode, as represented by step 148. During the LOW GAIN CLOSED LOOP focus mode, focus actuator 86 will drive objective lens 24 and maintain focus in response to the low gain focus error signal. The resulting movements, or excursions, of objective lens 24 from the offset positions, such as 110A, are illustrated in FIG. 6. Focus capture control 64 then allows objective lens 24 to settle for a delay period of preferably one to five milliseconds (step 150), after which time a CLEAR signal is produced and supplied to track crossing counter 62. Focus capture control 64 thereby causes track crossing counter 62 to count any and all track crossing signals produced by track crossing detector 60, for a predetermined first time period as represented by step 152 in FIG. 7. In preferred embodiments, focus capture control 64 causes the first time period to be within a range of about 10 to 15 milliseconds.

If after the first time period less than a predetermined first number of track crossings are counted, focus capture control 64 causes lens focus drive circuit 30 to operate in its OPEN LOOP focus mode, and to drive objective lens 24 to succeeding offset position 110B. As illustrated in FIG. 6, offset position 110B is displaced from the opposite side of the neutral position as offset position 110A, by the same distance D. The initiation of this procedure is illustrated by step 154. In preferred embodiments of the present invention, focus capture control 64 will implement step 154 unless the first number of track crossings counted is within a range of about 2 to 5. Steps 144 through 154 are repeated at each successive offset position, with displacement of successive offset positions increasing, so long as less than the first number of track crossings are counted during the first time period. This procedure is, for example, illustrated in FIG. 6 by offset positions 110A through 110D.

If during the first time period at least the first number of track crossings are counted (step 156), focus capture control 64 causes lens focus drive circuit 30 to operate in the HIGH GAIN CLOSED LOOP focus mode, as shown by step 158. In the HIGH GAIN CLOSED LOOP focus mode, focus actuator 86 will drive objective lens 24 and maintain focus in response to the high gain focus error signal. Due to the higher sensitivity of the high gain focus error signal, the excursions of objective lens 24 from an offset position (such as 110E) during the HIGH GAIN CLOSED LOOP mode are greater than those in the LOW GAIN CLOSED LOOP mode, as illustrated in FIG. 6. After switching lens focus drive circuit 30 into the HIGH GAIN CLOSED LOOP focus mode, focus capture control 64 allows objective lens 24 to settle for a second delay period, as represented by step 160, and then produces a CLEAR signal which is propagated to track crossing counter 62. Focus capture control 64 then causes track crossing counter 62 to count track crossing signals for a predetermined second time period as represented by step 162. In preferred embodiments, the second time period within a range of about 40 to 50 milliseconds.

If less than a predetermined second number of track crossings are counted during the second time period while lens focus drive circuit 30 is operated in the HIGH GAIN CLOSED LOOP focus mode (step 164), focus capture control 64 causes lens focus drive circuit 30 to again operate in the OPEN LOOP focus mode, and to position objective lens 24 at a succeeding offset position. In preferred embodiments, step 164 is implemented unless a second number of track crossings within a range of 10 to 15 are counted during the second time period. Steps 144 through 164 are then repeated. The steps described above are illustrated by offset positions 110E and 110F in FIG. 6. At offset position 110E, for example, at least the first number of track crossings were counted during the first time period. Less than the second number of track crossings were counted during the second time period, however, and objective lens 24 was cyclically driven to succeeding offset position 110F. At offset position 110F, less than the first number of track crossings were counted during the first time period, and objective lens 24 was cyclically driven to succeeding offset position 110G.

Figure 7:
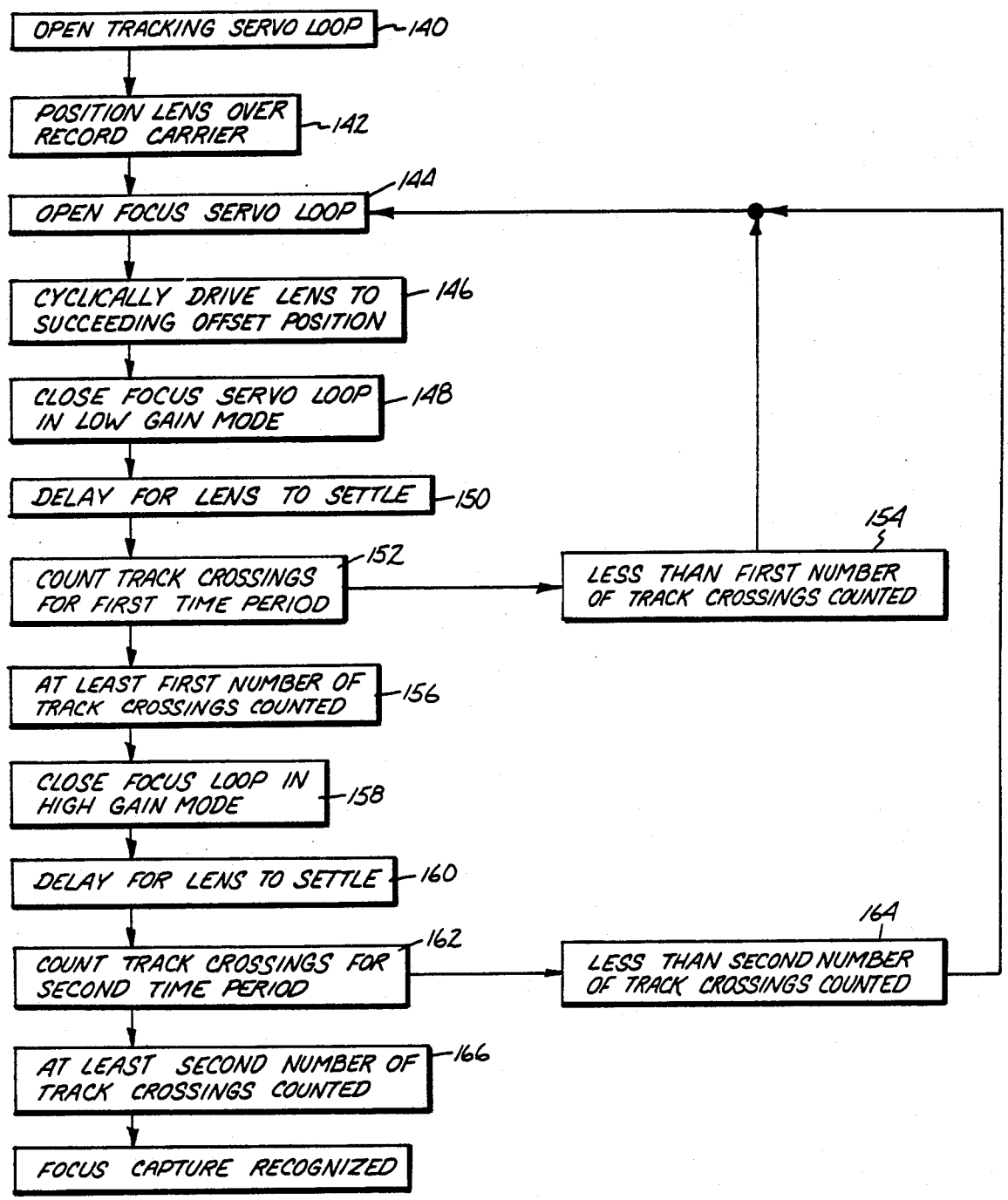
FIG. 7 is a flow chart illustrating steps performed by the focus initialization sytem.

If at least the second number of track crossings are counted during the second time period while lens focus drive circuit 30 is operated in the HIGH GAIN CLOSED LOOP focus mode, step 166 in FIG. 7, focus capture is recognized. Focus initialization system 10 therefore utilizes a two step track crossing recognition procedure to obtain an indication of focus capture. In a preferred embodiment, the HIGH GAIN CLOSED LOOP focus mode is the regular closed loop focus mode in which lens focus drive circuit 30 operates once focus capture is recognized. Lens focus drive circuit 30, therefore, continues to operate in the HIGH GAIN CLOSED LOOP focus mode as shown by offset position 110G in FIG. 6. Focus capture control 64 can then operate lens tracking drive circuit 32 in either the OPEN LOOP tracking mode, or the CLOSED LOOP tracking mode as required for the particular operation being implemented.

Focus initialization system 10 of the present invention requires very little specialized hardware. Other than gain control 84 and track crossing detector 60, all elements of focus initialization system 10 can be implemented by elements common to prior art data recording systems. Track crossing detector 60 is easily implemented by a Schmitt trigger or similar circuit. Circuits of this type are well known, small, and inexpensive. As shown in FIG. 1, gain control 84 can be implemented by two inexpensive resistors. Clearly, focus initialization system 10 is very inexpensive, despite the high degree of accuracy and high speed which can be achieved by its use. These characteristics are very important for economically practical optical recording systems.

The software required to implement the method performed by focus initialization system 10, as evidenced by FIG. 7, is easily developed by skilled programmers. Since this method uses a minimum number of steps, and is straightforward, it requires little memory space. Additional memory circuits will, therefore, not be required to implement this method. System economy is again apparent.

Although the present invention has been described with reference to preferred embodiments, workers skilled in the art will recognize that changes may be made in form and detail without departing from the spirit and scope of the invention.

What is claimed is:

1. Apparatus for positioning objective lens means within focus capture range of an optical record carrier recording surface in an optical data recording system, including:
- an optical record carrier having a recording surface on which servo track portions are substantially concentrically positioned and radially spaced about a rotational axis;
- motor means for rotating the record carrier about its rotational axis;
- objective lens means for focusing a beam of radiation along a focus axis oriented generally perpendicular to the record carrier recording surface, and for collecting modulated radiation from the record carrier;
- detector means responsive to the objective lens means for producing signals representative of modulated radiation collected by the objective lens means;
- lens focus drive means for driving and positioning the objective lens means along the focus axis in response to focus drive signals; and
- focus capture recognition means responsive to the detector means for producing the focus drive signals in a manner causing the lens focus drive means to cyclically drive the objective lens means about a neutral position between offset positions along the focus axis, and increase displacement of the offset positions from the neutral position until the objective lens means is within focus capture range of the record carrier recording surface, and for determining at each offset position whether the objective lens means is positioned within focus capture range of the record carrier recording surface thereby sufficiently focusing the beam of radiation onto the recording surface to enable the detector means to produce signals representative of the servo track portions.

2. The apparatus of claim 1 wherein:
the detector means includes:
- tracking error detector means for producing a tracking error signal representative of position, along a tracking axis generally radially oriented with respect to the rotational axis, of the objective lens means relative to individual servo track portions; and the focus capture recognition means includes:
- track crossing detector means responsive to the tracking error detector means for producing track crossing signals representative of relative motion, along the tracking axis, between the objective lens means and individual servo track portions of the record carrier;
- track crossing counter means responsive to the track crossing detector means for counting track crossing signals and for producing a signal representative of the number of track crossing signals produced by the track crossing detector means; and
- focus capture control means responsive to the track crossing counter means for determining whether a predetermined first number of track crossing signals are counted within a predetermined first time period at each offset position, and for producing the focus drive signals as a function of the determination.

3. The apparatus of claim 2 wherein the track crossing detector means produces the track crossing signals in the form of pulses representative of relative motion between the objective lens means and individual servo track portions.

4. The apparatus of claim 3 wherein the track crossing counter means comprises a digital counter responsive to the track crossing detector means for producing a digital signal representative of the number of pulses produced by the track crossing detector means.

5. The apparatus of claim 2 wherein the predetermined first number is a number within a range of about 2 to 5 and wherein the predetermined first time period is within a range of about 10 to 15 milliseconds.

6. The apparatus of claim 2 wherein the focus capture control means produces the offset position signal in a form representative of offset positions having displacements which successively increase from the neutral position.

7. The apparatus of claim 2 and further including:
lens tracking drive means responsive to the focus capture control means for driving and positioning the objective lens means along a tracking axis generally radially oriented with respect to the rotational axis of the record carrier, wherein the relative motion between the objective lens means and the individual servo track portions is resultant from eccentricity of the servo track portions position relative to the rotational axis of the record carrier, while the record carrier is rotated by the motor means and the objective lens means is fixedly positioned on the tracking axis by the lens tracking drive means.

8. The apparatus of claim 7 wherein:
the tracking drive signals produced by the focus capture control means include a closed loop tracking mode control signal and an open loop tracking mode control signal representative of the mode of operation of the lens tracking drive means, and a tracking position signal representative of objective lens means position on the tracking axis; and
the tracking drive means includes:
- tracking mode switch means having an error signal input terminal connected to receive the tracking error signal, a position signal input terminal connected to receive the tracking position signal, a control input terminal connected to receive the open loop tracking mode control signal and the closed loop tracking mode control signal, and an output terminal, the tracking mode switch means supplying the tracking error signal to the output terminal upon receiving the closed loop tracking mode control signal at the control input terminal, and supplying the tracking position signal to the output terminal upon receiving the open loop tracking mode control signal at the control input terminal; and
- tracking actuator means responsive to the tracking mode switch means for driving and positioning the objective lens means along the tracking axis, the lens tracking drive means operating in an open loop tracking mode and the tracking actuator means positioning the objective lens means on the tracking axis at positions represented by the tracking position signal when the focus capture control means produces the open loop tracking mode control signal, and the lens tracking drive means operating in a closed loop tracking mode and the tracking actuator means maintaining the objective lens means at positions along the tracking axis adjacent a servo track portion in response to the tracking error signal when the focus capture control means produces the closed loop tracking mode control signal.

9. The apparatus of claim 8 wherein:
   the tracking drive signals produced by the focus capture control means are digital signals; and
   the tracking drive means further includes:
   digital-to-analog converter means responsive to the focus capture control means for converting a digital tracking position signal to an analog tracking position signal, the analog tracking position signal being applied to the position signal input terminal of the tracking mode switch means.

10. The apparatus of claim 8 wherein the focus capture control means produces the open loop tracking mode control signal and produces the tracking position signal is a form representative of a stationary position on the tracking axis, while the apparatus is positioning the objective lens means within focus capture range of the record carrier recording surface.

11. The apparatus of claim 7 wherein:
    the detector means further includes:
    focus error detector means for producing a focus error signal representative of objective lens means position, along the optical axis, relative to the record carrier; and
    the focus drive signals produced by the focus capture control means include an open loop focus mode control signal and a first closed loop focus mode control signal representative of the mode of operation of the lens focus drive means, and an offset position signal representative of offset positions of the objective lens means on the focus axis; and
    the lens focus drive means includes:
    focus mode switch means having a first focus error input terminal connected to receive a first gain focus error signal representative of the focus error signal produced by the focus error detector means, a position input terminal connected to receive the offset position signal, a control input terminal connected to receive the open loop focus mode control signal and the first closed loop focus mode control signal, and an output terminal, the focus mode switch means supplying the first gain focus error signal to the output terminal upon receiving the first closed loop focus mode control signal at the control input terminal, and supplying the offset position signal to the output terminal upon receiving the open loop focus mode control signal at the control input terminal; and
    focus actuator means responsive to the focus mode switch means for driving and positioning the objective lens means along the focus axis, the lens focus drive means operating in an open loop mode and the focus actuator means positioning the objective lens means at offset positions represented by the offset position signal when the focus capture control means produces the open loop focus mode control signal, and the lens focus drive means operating in a first closed loop mode and the focus actuator means causing the objective lens means to maintain focus on a servo track portion in response to the first gain focus error signal when the focus capture control means produces the first closed loop mode control signal.

12. The apparatus of claim 11 wherein:
    the focus drive signals produced by the focus capture control means are digital signals; and
    the lens focus drive means further includes:
    digital-to-analog converter means responsive to the focus capture control means for converting a digital focus position signal, the analog focus position signal being applied to the position input terminal of the focus mode switch means.

13. The apparatus of claim 11 wherein the focus mode switch means comprises a multiplexer.

14. The apparatus of claim 11 wherein:
    the focus capture control means causes the lens focus drive means to operate in the first closed loop focus mode and causes the track crossing counter means to count track crossings for the first time period, after the focus capture control means causes the lens focus drive means to operate in the open loop focus mode and position the objective lens means at each offset position; and
    the focus capture control means operates the lens focus drive means in the open loop mode and positions the objective lens means at a succeeding offset position unless at least the first number of track crossings are counted during the first time period.

15. The apparatus of claim 14 wherein:
    the lens focus drive means further includes:
    focus loop gain control means responsive to the focus error detector means for controlling gain of the focus error signal and for producing the first gain focus error signal, wherein the first error signal input terminal of the focus mode switch means is connected to receive the first gain focus error signal.

16. The apparatus of claim 15 wherein:
    the focus drive signals produced by the focus capture control means include a second closed loop focus mode control signal;
    the focus loop gain control means produces a second gain focus error signal, wherein the focus loop gain control means causes gain of the second gain focus error signal to be greater than a gain of the first gain focus error signal, and
    the focus mode switch means further includes a second error signal input terminal connected to receive the second gain focus error signal, wherein the focus mode switch means supplies the second gain focus error signal to the output terminal upon receiving the second closed loop focus mode control signal at the control input terminal, the lens focus drive means thereby operating in a second closed loop focus mode and the focus actuator means causing the objective lens means to maintain focus on a servo track portion in response to the second gain focus error signal.

17. The apparatus of claim 16 wherein:
    the focus capture control means causes the lens focus drive means to operate in the second closed loop focus mode and causes the track crossing counter means to count track crossings for a predetermined second time period if at least the first number of track crossings were counted during the first time period while the lens focus drive means was operated in the first closed loop mode; and
    the focus capture control means causes the lens focus drive means to operate in the open loop focus mode and position the objective lens means at a succeeding offset position unless at least a predetermined second number of track crossings are counted during the second time period.

18. The apparatus of claim 17 wherein the predetermined second time period is a period within a range of about 40 to 50 milliseconds, and the predetermined second number of track crossings is a number within a range of about 10 to 15.

19. The apparatus of claim 17 wherein the focus capture control means recognizes focus capture and causes the lens focus drive means to operate in the second closed loop focus mode if at least the second number of track crossings were counted during the second time period.

20. In an optical data recording system of the type having an optical record carrier with a recording surface on which servo track portions are substantially concentrically positioned and radially spaced, an objective lens, a detector, a focus servo system including a focus servo control loop and a controller for opening and closing the focus servo control loop; a method for positioning the objective lens within focus capture range of the optical record carrier recording surface, including:
cyclically driving the objective lens along a focus axis about a neutral position between offset positions while increasing displacement of the offset positions from the neutral position; and
determining whether the objective lens is within focus capture range of the record carrier recording surface at each peak offset position by determining whether at least a predetermined first number of track crossings are detected within a predetermined first time period.

21. The method of claim 20 and further including:
opening the focus servo control loop before driving the objective lens to the offset positions.

22. The method of claim 21 and further including:
closing the focus servo control loop and operating the focus servo system at a first closed control loop gain before determining whether the objective lens is within focus capture range of the recording surface at each offset position.

23. The method of claim 22 and further including:
delaying the determination of whether the objective lens is within focus capture range of the recording surface at each offset position by a delay period after closing the focus servo control loop.

24. The method of claim 23 wherein the delay period is within a range of about one to five milliseconds.

25. The method of claim 22 and further including:
opening the focus servo control loop and driving the objective lens to a succeeding offset position unless at least the first number of track crossings are detected within the first time period.

26. The method of claim 25 and further including:
operating the focus control servo system at a second closed loop gain when at least the first number of track crossings are detected within the first time period, wherein the second closed control loop gain is a higher gain than the first closed control loop gain;
determining whether at least a predetermined second number of track crossings are detected within a predetermined second time period; and
opening the focus servo control loop and driving the objective lens to a succeeding offset position unless at least the second number of track crossings are detected within the second time period.

27. The method of claim 26 and further including:
delaying the determination of whether the second number of track crossings are detected within the second time period by a second delay period after operating the focus servo system at the second closed control loop gain.

28. The method of claim 27 wherein the second delay period is within a range of about one to five milliseconds.

29. The method of claim 26 wherein the second number of track crossings is a greater number than the first number, and the second time period is a longer time period than the first time period.

30. The method of claim 29 wherein the first number of track crossings is within a range of about two to five and the first time period is within a range of about ten to fifteen milliseconds.

31. The method of claim 29 wherein the second number of track crossings is within a range of about ten to fifteen and the second time period is within a range of about forty to fifty milliseconds.

32. The method of claim 20 wherein the optical data storage system also has a tracking servo system including a tracking servo control loop which can be opened and closed by the controller, for driving the objective lens about a tracking axis, and further including:
opening the tracking servo control loop and fixedly positioning the objective lens on the tracking axis while cyclically driving the objective lens along the optical axis and determining whether the objective lens is within focus capture range of the record carrier recording surface, wherein track crossings are produced by relative motion between the objective lens and servo track portions due to eccentric positioning of servo track portions on the record carrier.

33. The method of claim 20 and further including:
increasing displacement of the peak offset positions from the neutral position with each successsive cycle.

34. Apparatus for positioning objective lens means within focus capture range of an optical record carrier recording surface in an optical data recording system, including:
an optical record carrier having a recording surface on which servo track portions are substantially concentrically positioned and radially spaced about a rotational axis;
motor means for rotating the record carrier about its rotational axis;
objective lens means for focusing a beam of radiation along a focus axis oriented generally perpendicular to the record carrier recording surface, and for collecting modulated radiation from the record carrier;
tracking error detector means for producing a tracking error signal representative of position, along a tracking axis generally radially oriented with respect to the rotational axis, of the objective lens means relative to individual servo track portions;
lens focus drive means for driving and positioning the objective lens means along the focus axis in response to focus drive signals;
track crossing detector means responsive to the tracking error detector means for producing track crossing signals representative of relative motion, along the tracking axis, between the objective lens means and individual servo track portions of the record carrier; and focus capture control means responsive to the track crossing detector means for producing the focus drive signals in a manner causing the lens focus drive means to drive the objective lens means along the focus axis until the objective lens means is within focus capture range of the record carrier recording surface, and for determining whether the objective lens means is positioned within focus capture range of the record carrier recording surface as a function of the track crossing signals.

35. The apparatus of claim 34 and further including:

track crossing counter means responsive to the track crossing detector means for counting track crossing signals and for producing a signal representative of the number of track crossing signals produced by the track crossing detector means; wherein the focus capture control means determines whether a predetermined first number of track crossing signals are counted within a predetermined first time period and produces the focus drive signals as a function of the determination.

36. A method for detecting focus capture in an optical data recording system of the type having an optical record carrier with a recording surface on which servo track portions are substantially concentrically positioned and radially spaced, and an objective lens, including:

sensing track crossings representative of relative motion between the objective lens and the servo track portions; and using sensed track crossings as an indication of focus capture.

* * * * *